US009607180B2

(12) United States Patent
Sugano

(10) Patent No.: US 9,607,180 B2
(45) Date of Patent: Mar. 28, 2017

(54) INFORMATION PROCESSING APPARATUS, CONTROL METHOD FOR CONTROLLING THE INFORMATION PROCESSING APPARATUS IN A MAINTENANCE MODE, AND STORAGE MEDIUM

(71) Applicant: CANON KABUSHIKI KAISHA, Tokyo (JP)

(72) Inventor: Yasuharu Sugano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 14/541,467

(22) Filed: Nov. 14, 2014

(65) Prior Publication Data

US 2015/0143506 A1 May 21, 2015

(30) Foreign Application Priority Data

Nov. 20, 2013 (JP) ................. 2013/240257
Jun. 3, 2014 (JP) ................. 2014-115316

(51) Int. Cl.
*G06F 21/85* (2013.01)
*G06F 21/57* (2013.01)
*H04L 9/08* (2006.01)
*H04L 9/32* (2006.01)

(52) U.S. Cl.
CPC .............. *G06F 21/85* (2013.01); *G06F 21/57* (2013.01); *H04L 9/0897* (2013.01); *H04L 9/3234* (2013.01)

(58) Field of Classification Search
CPC ................. H04L 9/3234; H04L 9/0897; H04L 2209/127; G06F 21/57; G06F 21/85
See application file for complete search history.

(56) References Cited

U.S. PATENT DOCUMENTS

| 2005/0091520 | A1* | 4/2005 | Khan | G06F 11/3648 713/194 |
| 2005/0273623 | A1* | 12/2005 | Huang | G06K 19/07345 713/183 |
| 2006/0053302 | A1* | 3/2006 | Yasaki | H04L 9/0822 713/183 |
| 2007/0206546 | A1* | 9/2007 | Alberth, Jr. | H04L 63/12 370/338 |
| 2009/0210456 | A1* | 8/2009 | Subramaniam | G06F 21/57 |

(Continued)

FOREIGN PATENT DOCUMENTS

JP 2005-99949 A 4/2005
KR 10-2011-0139131 A 12/2011

OTHER PUBLICATIONS

Kawasaki et al., "High-Performance Computing Service Over the Internet for Intraoperative Image Processing", Mar. 2004, Retrieved from http://ieeexplore.ieee.org/stamp/stamp.jsp?tp=&arnumber=1271299.*

(Continued)

*Primary Examiner* — Chau Le
(74) *Attorney, Agent, or Firm* — Fitzpatrick, Cella, Harper & Scinto

(57) ABSTRACT

In an information processing apparatus and a method of controlling the same, settings for prohibiting an access to a removable medium is performed, and even if the setting is set, the access to the removable medium is permitted in a case where the information processing apparatus is activated in the maintenance mode.

16 Claims, 14 Drawing Sheets

(56) References Cited

U.S. PATENT DOCUMENTS

| | | | | |
|---|---|---|---|---|
| 2010/0199077 A1* | 8/2010 | Case | .................. | G06F 11/3656 713/1 |
| 2011/0296410 A1* | 12/2011 | Lo | ............................ | G06F 8/65 718/1 |
| 2011/0314241 A1* | 12/2011 | Yamamizu | ......... | G03G 15/5016 711/162 |
| 2013/0151858 A1* | 6/2013 | Wang | .................. | G06F 12/1466 713/182 |
| 2015/0222604 A1* | 8/2015 | Ylonen | ................ | H04L 63/062 713/171 |

OTHER PUBLICATIONS

SATO America, "LM408/412e Printer—Operator Manual", Retrieved from https://www.satoamerica.com/uploads/files/datasheets/LM408e_412e%20Operator%20Manual.pdf, Published Feb. 23, 2006, pp. 1-98.*

* cited by examiner

INFORMATION PROCESSING APPARATUS, CONTROL METHOD FOR CONTROLLING THE INFORMATION PROCESSING APPARATUS IN A MAINTENANCE MODE, AND STORAGE MEDIUM

BACKGROUND OF THE INVENTION

Field of the Invention

The present invention relates to an information processing apparatus, a method of controlling the same, and a storage medium.

Description of the Related Art

In recent years, due to an increase in the number of functions of information processing apparatuses (hereinafter referred to as devices) such as PCs (Personal Computer), multi function peripherals, or the like, devices in offices are provided with many settings. As a consequence, device setting has become complicated, and there is the possibility that the device will be operated with a setting for which there is a risk from a security perspective based on the operation environment of the device. For this reason, it is advantageous that settings of a device in an office be operated in accordance with a security policy (hereinafter referred to as a policy) that a security manager, who manages security in the office, has established. In a large scale office environment, in many cases, the security manager is a different person to the administrator of the devices of the office. In other words, the administrator of the devices manages devices for which setting is performed in accordance with a policy established by the security manager. Accordingly, a general user uses a device which is managed by the administrator, and for which setting in accordance with the policy established by the security manager is performed.

An example of such a policy is a policy for prohibiting the usage of USB (Universal Serial Bus) with the objective of preventing information leakage from a USB memory (hereinafter referred to as a USB usage prohibition policy). Also, another example of such a policy is a policy of forcing the usage of a TPM (Trusted Platform Module), for example, with the objective of safely managing confidential data within devices (hereinafter referred to as a forced TPM usage policy). A TPM is a security chip that has a tamper resistance and is capable of safely managing an encryption key. In general, devices equipped with TPM realize encryption of confidential data and safe management of confidential data by safely managing a key used for the encryption within the TPM.

Furthermore, there is demand for optimization of work that is applied to complicated settings for multiple devices, and an approach for performing multiple settings for multiple devices via a network has been proposed in Japanese Patent Laid-Open No. 2005-99949, for example. With this, it becomes possible for a security manager, or the like, to operate devices in an office with settings in accordance with a unified policy by performing multiple settings via the network on the devices in the office.

There are cases where a specialist worker, dispatched from a support center of a device dealer, determines a condition of a device in an office for maintenance, or upon an occurrence of a malfunction. In such a case, there are cases in which information for analyzing the condition of the device (hereinafter referred to as a log) is stored in a USB memory. Here, in a case where the USB usage prohibition setting is performed for the device, the log cannot be obtained via a USB I/F unless the USB usage prohibition setting is released by the security manager. In other words, there is a problem in that with device operation under the USB usage prohibition setting, while security is improved, convenience is reduced due to the fact that required information cannot be obtained via USB when necessary.

In addition, in a case where a TPM is used, a backup of an encryption key managed in the TPM (hereinafter referred to as a TPM key) is necessary in preparation for a case in which a malfunction or a loss of the TPM occurs. Such a backup of the TPM key is performed by obtaining the TPM key by USB in many cases. However, in such cases, the backup of the TPM key cannot be taken if the USB usage prohibition setting and the TPM usage setting are set for the device by the security manager. In other words, the USB usage prohibition setting and the TPM usage setting are contentious and cannot both be set. In such a case, it is necessary for the security manager to first release the USB usage prohibition setting on all of the devices set in accordance with the policy, and then, after the backup of the TPM key has been completed on all of the devices, to once again perform the USB usage prohibition setting, and this is inconvenient.

SUMMARY OF THE INVENTION

An aspect of the present invention is to eliminate the above-mentioned problems with conventional technology.

A feature of the present invention is to provide a technique by which, for example, a log or a backup of a TPM key to a storage device is made possible even in a case where access to the storage device is prohibited.

The present invention in its first aspect provides an information processing apparatus, comprising: a setting unit configured to perform setting for prohibiting an access to a removable medium; and a controller configured to control, even if the setting is set by the setting unit, to permit access to the removable medium in a case where the information processing apparatus is activated in a maintenance mode.

The present invention in its second aspect provides a method of controlling an information processing apparatus having a connection unit for connecting a storage device, the method comprising: a setting step of performing settings for prohibiting an access to a removable medium; and a control step of controlling, even if the setting is set in the setting step, to permit access to the removable medium in a case where the information processing apparatus is activated in a maintenance mode.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

The first embodiment of the present invention relates to control for enabling a usage of USB memory by an activation mode in a case where a USB usage prohibition setting (a setting for prohibiting access to a USB memory connected to a USB I/F) has been set in the information processing apparatus. With this, even if operation of the information processing apparatus is being carried out under the USB usage prohibition setting, usage of the USB becomes possible in a predetermined circumstance such as during maintenance of the information processing apparatus by a serviceman. Note that in the embodiments explained below, explanation is given with reference to a multi function peripheral 101 according to embodiments, which is one example of an information processing apparatus.

Figure 1:
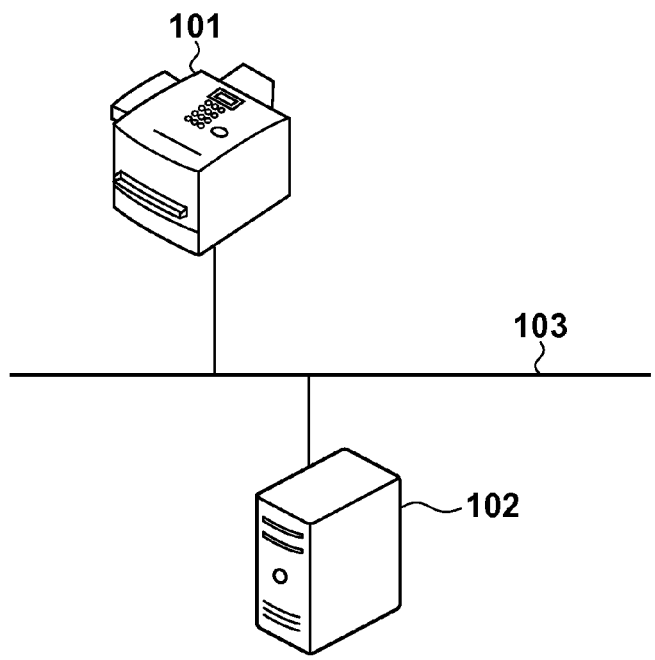
FIG. 1 depicts a view illustrating an example of configuration of a network comprising a multi function peripheral according to a first embodiment of the present invention.

FIG. 1 depicts a view illustrating an example configuration of a network comprising the multi function peripheral 101 according to a first embodiment of the present invention.

The multi function peripheral 101 and a server (the management terminal) 102 are connected via a network 103. The server 102 is capable of performing multiple settings on the multi function peripheral 101 via the network 103. Note that in the first embodiment, an example is shown in which only one of each of the server 102 and the multi function peripheral 101 is connected via the network 103, but the present invention is not limited to this.

Figure 2:
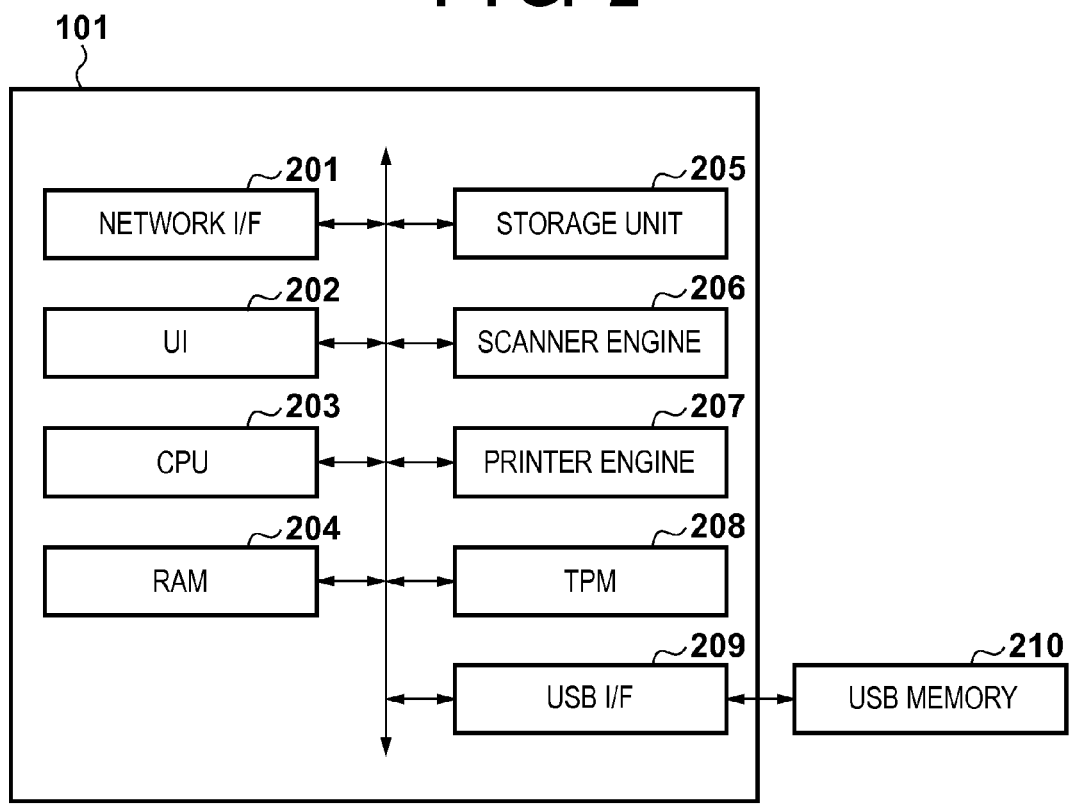
FIG. 2 is a block diagram for explaining a hardware configuration of the multi function peripheral according to the first embodiment.

FIG. 2 is a block diagram for explaining a hardware configuration of the multi function peripheral 101 according to the first embodiment.

A network interface (I/F) 201 performs communication with an external device such as the server 102 via the network 103. A UI (user interface) 202 comprises an operation panel equipped with a display unit, and along with accepting settings for the multi function peripheral 101, the UI 202 displays various information, and enables operation by a user. A CPU 203 deploys into a RAM 204, and executes, a program code stored in a storage unit 205, and performs overall control of the multi function peripheral 101. The RAM 204 stores program code that the CPU 203 executes and temporarily stores various information such as, image data, and the like. The storage unit 205 stores various information such as the program code, image data, and the like. A scanner engine 206 optically scans an image printed on a sheet, and output image data of the image. A printer engine 207 prints an image onto a sheet in accordance with image data. The printer engine 207 is an electrophotographic printer engine, an ink-jet printer engine, or the like. A TPM chip 208 safely saves a key for encrypting confidential data saved on the storage unit 205, or the like. The TPM chip 208 is a security chip referred to as a TPM (Trusted Platform Module) having tamper resistance. A USB I/F 209 is a USB interface for connecting a USB memory 210 to the multi function peripheral 101.

Figure 3:
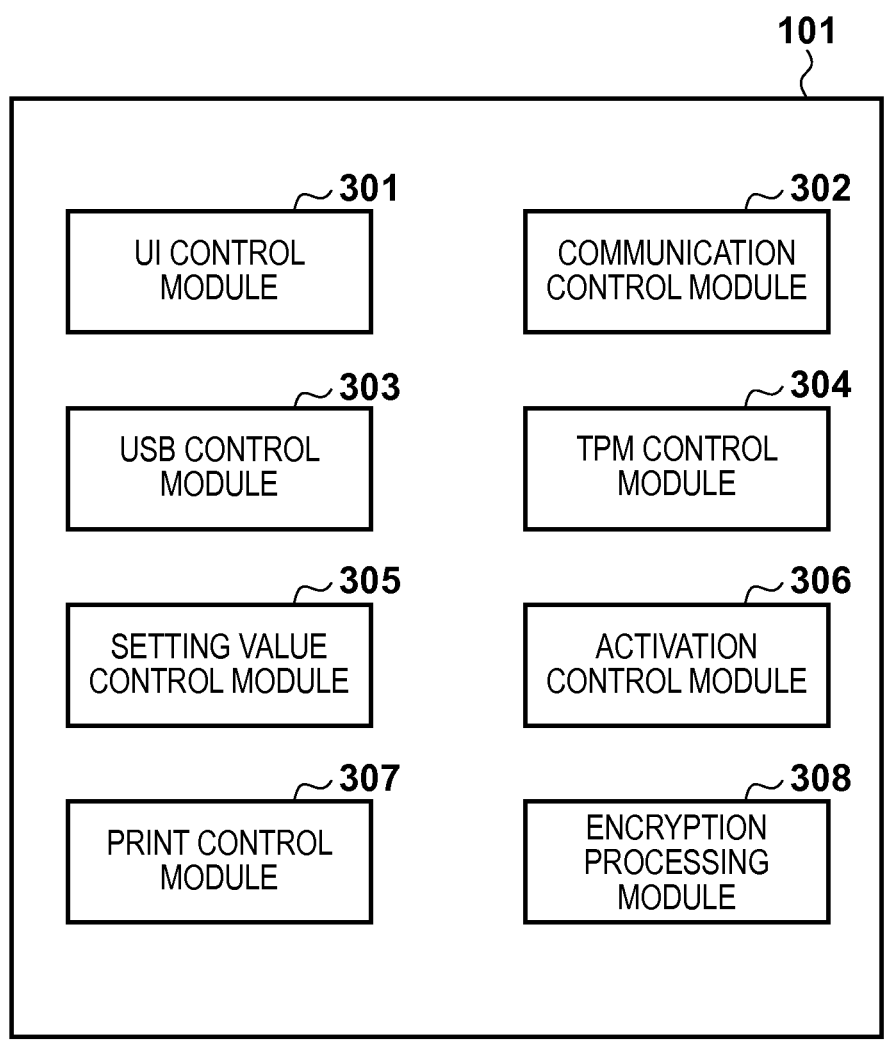
FIG. 3 is a block diagram for showing a software configuration of the multi function peripheral according to the first embodiment.

FIG. 3 is a block diagram for showing a software configuration of the multi function peripheral 101 according to the first embodiment. Here, while there is no particular limitation, control modules and an encryption processing module are realized by control programs stored in the storage unit 205, and by the CPU 203 executing these control programs, the functions corresponding to each module are realized.

A UI control module 301 controls the UI 202, and accepts requests such those for a display of various information to the UI 202, or for input by a user via the UI 202. A communication control module 302 performs data transmission and receiving via the network I/F 201. A USB control module 303 controls loading and unloading of a USB driver (a mass storage class driver), recognizes the USB memory 210 connected to the USB I/F 209, and performs a writing of data into the USB memory 210, and a reading out of data from the USB memory 210. A TPM control module 304 performs control relating to the TPM chip 208 such as encryption and decryption of data by the TPM chip 208 and management of keys. A setting value control module 305 performs a modification of various settings relating to the multi function peripheral 101 which are saved on the storage unit 205. An activation control module 306 executes an activation mode in accordance with a predetermined activation pattern. For example, in this embodiment, the multi function peripheral 101 is provided with two activation patterns: a normal mode and a maintenance mode. Here, the normal mode is a general activation mode, and in the normal mode, the user simply turns on a power switch to activate the multi function peripheral 101. The maintenance mode is a mode for performing special work, and is a mode for a worker of a support center, or the like, (hereinafter referred to as a serviceman) performing an activation operation upon maintenance work, the occurrence of a malfunction, or the like, for example. An activation in the maintenance mode is enabled only in a case where the serviceman activates the multi function peripheral 101 in accordance with a predetermined procedure, and the activation procedure is not published to general users, and is only known by the serviceman. In this way, when the multi function peripheral 101 is activated in the normal mode or the maintenance mode, the activation control module 306 saves the activation mode in the storage unit 205. A print control module 307 performs print processing by controlling the scanner engine 206 and the printer engine 207. An encryption processing module 308 performs encryption related processing and certificate related processing.

Figure 5:
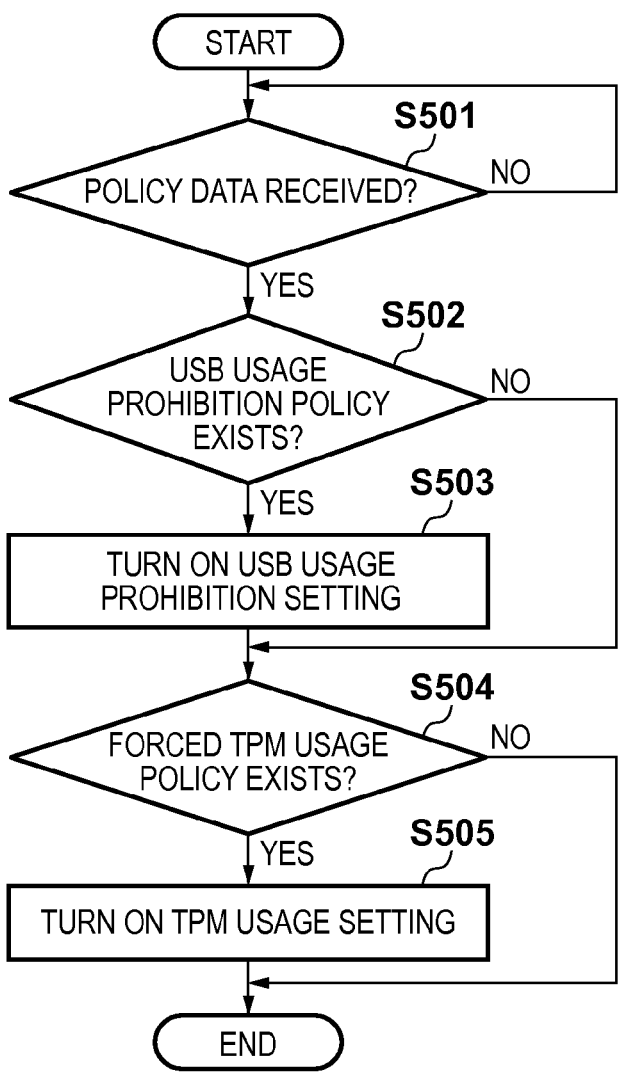
FIG. 5 is a flowchart for describing control processing for when the multi function peripheral according to the first embodiment receives data of a USB usage prohibition policy or a forced TPM usage policy.

FIG. 5 is a flowchart for describing control processing for when the multi function peripheral 101 according to the first embodiment receives data of a USB usage prohibition policy or a forced TPM usage policy from the server 102. This processing is realized by the CPU 203 executing a program deployed into the RAM 204, but here explanation is given with the processing being performed by the control modules shown in FIG. 3.

In step S501, the communication control module 302 receives, from the server 102, via the network I/F 201, list data of setting information for complying with a policy (hereinafter referred to as policy data). With this, the processing proceeds to step S502, and the setting value control module 305 updates a setting value based upon policy data received in step S501. Specifically, it is determined whether or not a USB usage prohibition policy is included as a policy to be enabled in the policy data. Then, if it is determined that the USB usage prohibition policy is included, the processing proceeds to step S503, and the setting value control module 305 turns on a predetermined setting value corresponding to the USB usage prohibition setting saved in the storage unit 205. Note that if, in step S502, the USB usage prohibition policy is not included, step S503 is skipped, and the processing proceeds to step S504.

In step S504, the setting value control module 305 determines whether or not the forced TPM usage policy is included in policy data as a policy to be enabled. Here, if it is determined that the forced TPM usage policy is included, the processing proceeds to step S505, and the setting value control module 303 turns on a setting value corresponding to the forced TPM usage policy saved in the storage unit 205 and the processing ends. In step S504, if it is not determined that the forced TPM usage policy is included, then the processing ends.

In this way, the server 102 is able to perform, for the multi function peripheral 101, a USB usage prohibition setting and a forcing setting so that the TPM is used.

Figure 4:
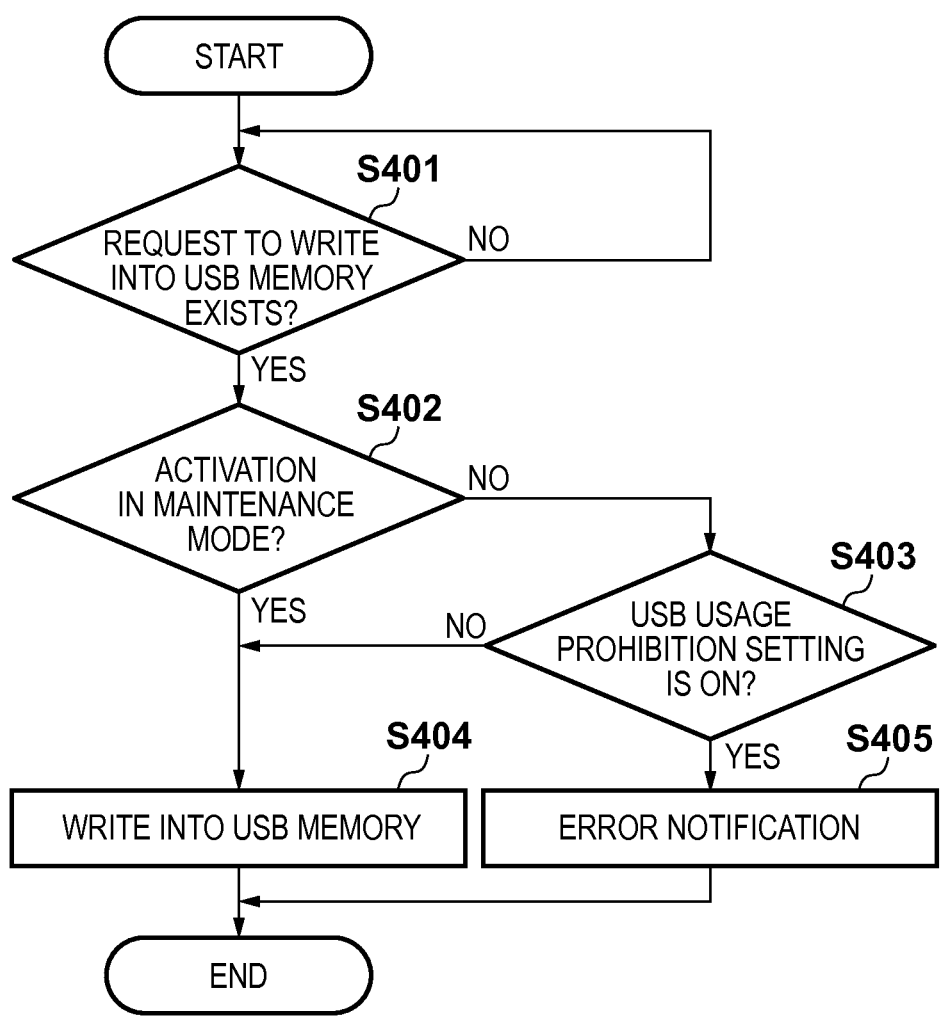
FIG. 4 is a flowchart for describing processing to make possible a usage of USB by an activation mode of the multi function peripheral in a case where a USB usage prohibition is set on the multi function peripheral according to the first embodiment.

FIG. 4 is a flowchart for describing processing to make possible a usage of USB by an activation mode of the multi function peripheral 101 in a case where a USB usage prohibition on the multi function peripheral 101 according to the first embodiment is set. This processing is realized by the CPU 203 executing a program deployed into the RAM 204, but here explanation is given with the processing being performed by the control modules shown in FIG. 3. In the present embodiment, in a case where the USB memory 210 is not connected to the USB I/F 209, i.e. in a case where the USB control module 303 does not recognize the USB memory 210, the UI control module 301 does not display a screen for performing a request to write into the USB memory 210.

Firstly, in step S401, the UI control module 301 determines whether or not there is a request to write into the USB memory 210 from the UI 202. In step S401, if it is determined that there is the request to write into the USB memory 210, the processing proceeds to step S402, and the activation control module 306 determines whether a predetermined setting value corresponding to the maintenance mode saved in the storage unit 205 is turned on (whether the maintenance mode is activated). If it is determined that the setting value is turned on (activation in the maintenance mode) in step S402, the processing proceeds to step S404, the USB control module 303 controls so as to write the data requested in step S401 into the USB memory 210, and the processing completes.

On the other hand, if it is determined that the setting value is turned off (activation in the normal mode) in step S402, the processing proceeds to step S403, and the USB control module 303 determines whether the predetermined setting value saved in the storage unit 205 corresponding to the USB usage prohibition setting is turned on (whether the USB usage prohibition setting is enabled). In step S403, if it is determined that the setting value is turned off (the USB usage prohibition setting is disabled), the processing proceeds to step S404, and the USB control module 303 writes into the USB memory 210 the data for which the request is made in step S401. On the other hand, in step S403, if it is determined that the setting value is turned on (the USB usage prohibition setting is enabled), the processing proceeds to step S405, and the UI control module 301 performs an error notification by displaying an error screen as illustrated in FIG. 6, for example, to the UI 202.

Figure 6:
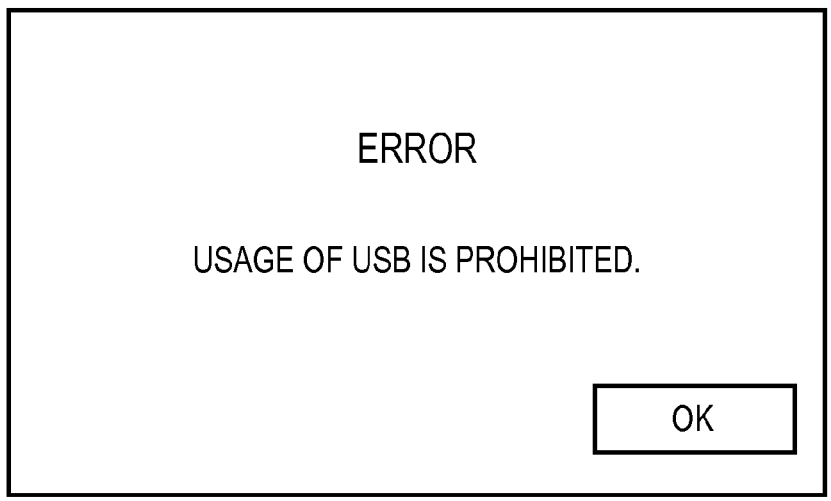
FIG. 6 depicts a view illustrating an example of an error screen displayed on a UI of the multi function peripheral according to the first embodiment and a second embodiment.

FIG. 6 depicts a view illustrating an example of an error screen displayed on the UI 202 of the multi function peripheral 101 according to embodiments.

In this screen, because usage of USB is prohibited, it is displayed that writing into the USB memory cannot be performed.

By the first embodiment, as explained above, even for a device upon which the setting for prohibiting the usage of the USB memory is enabled, it becomes possible to write into the USB memory a log, or a TPM key, by a serviceman performing a predetermined activation. More specifically, by the serviceman activating the device in the maintenance mode, a log can be obtained from the USB memory 210 connected via the USB I/F 209 even if a setting for prohibiting the usage of the USB memory is made. Also, there is the effect that it is possible to perform a backup of a TPM key using the USB memory.

Second Embodiment

In the first embodiment described above, explanation was given for an example in which the obtainment of information from the USB memory is possible if the serviceman knows the predetermined activation procedure, even if a setting for prohibiting the usage of the USB is made. However, in the first embodiment, an administrator of the device who is a different person from the security manager (hereinafter referred to as the administrator) cannot perform the backup of the TPM key. If the administrator can perform the backup of the TPM key, it is possible to take the backup of the TPM key immediately without relying upon the serviceman when the TPM usage setting is turned on due to the forced TPM usage policy, or the like, and so convenience is improved, and this is advantageous for operation.

In the second embodiment, explanation will be given for control that enables the administrator to perform the backup of the TPM key in a normal mode activation even in a case where it is requested that the USB usage prohibition setting and the usage setting for the TPM both be used. In other words, even if the multi function peripheral 101 is activated in the normal activation mode and the setting for prohibiting access to the USB memory and the TPM usage setting are set, the backup of the TPM key to the USB memory is allowed under the condition that the backup of the TPM key has not been performed. Note that in the second embodiment, it is assumed that the TPM related setting for the backup of the TPM key, or the like, can only be performed by an operator authenticated as the administrator. Also, because the hardware configuration of the multi function peripheral 101 and the system configuration according to the second embodiment are the same as in the case of the previously described first embodiment, their explanation will be omitted.

Figure 7:
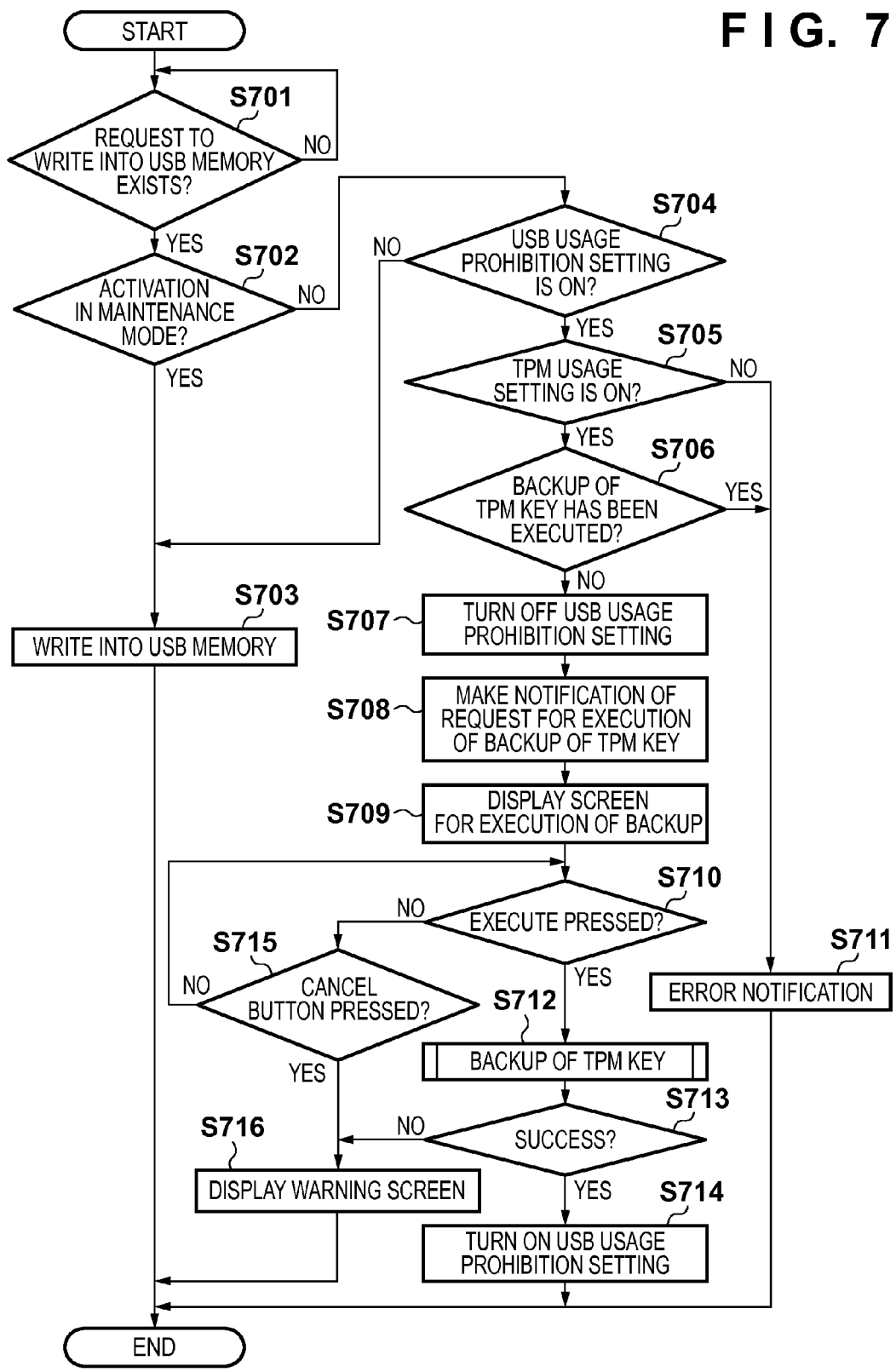
FIG. 7 is a flowchart for describing TPM key backup processing by the multi function peripheral according to the second embodiment.

FIG. 7 is a flowchart for describing TPM key backup processing by the multi function peripheral 101 according to the second embodiment. This processing is realized by the CPU 203 executing a program deployed into the RAM 204, but here explanation is given with the processing being performed by the control modules shown in FIG. 3. Note that the processing of step S701 and step S702 is the same as step S401 and step S402 of FIG. 4 of the first embodiment, and so explanation is omitted.

In step S702, the setting value control module 305 determines whether or not the activation mode is the maintenance mode, and if so, the processing proceeds to step S703, and the USB control module 303 writes into the USB memory 210 via the USB I/F 209 the data for which the request is received in step S701, and the processing completes. This is the same as in the case of the previously described first embodiment.

Meanwhile, in step S702, if it is determined that the activation mode is the normal mode, the processing proceeds to step S704, and the USB control module 303 determines whether the predetermined setting value corresponding to the USB usage prohibition setting saved in the storage unit 205 is turned on (whether the USB usage prohibition setting is enabled). If, in step S704, it is determined that the setting value is turned off (the USB usage prohibition setting is disabled), the processing proceeds to step S703, and the USB control module 303 writes the data for which the request is received in step S701 into the USB memory 210. This is similar to the normal processing of the first embodiment.

Meanwhile, in step S704, if it is determined that the setting value is turned on (the USB usage prohibition setting is enabled), the processing proceeds to step S705, and the TPM control module 304 determines whether or not the predetermined setting value corresponding to the TPM usage setting saved in the storage unit 205 is turned on. In a case where the setting value is turned off (the TPM usage setting is disabled) in step S705, the processing proceeds to step S711, the UI control module 301 performs an error notification by displaying an error screen such as that of FIG. 6, for example, to the UI 202, and the processing completes. Here, if there is the request to write into the USB memory, it is displayed that the usage of the USB is prohibited, and access to the USB is denied because the usage of the USB is prohibited and the TPM usage setting is disabled.

Also, in a case where it is determined, in step S705, that the TPM usage setting is enabled, the processing proceeds to step S706, and the TPM control module 304 determines whether or not the backup of the TPM key has been executed, by whether or not the setting value corresponding to the condition for execution of the backup of the TPM key saved in the storage unit 205 is turned off. If, in step S706, the setting value is turned on (the backup of the TPM key already performed), the processing proceeds to step S711, and the UI control module 301 performs an error notification by performing a display such as that of FIG. 6, for example, to the UI 202. Here, because the usage of the USB is prohibited, and the backup of the TPM key is already executed when there is the request to write into the USB memory, it is displayed that the usage of the USB memory is prohibited, and access to the USB memory is denied.

Meanwhile, in a case where, in step S706, the setting value is turned off (the backup has not been executed), the following processing, which is a characteristic of the second embodiment, is executed. Firstly, the processing proceeds to step S707, and the setting value control module 305 modifies the predetermined setting value corresponding to the USB usage prohibition setting saved in the storage unit 205 to be off. In other words, the USB memory 210 is made to be accessible by disabling the usage prohibition setting of the USB memory 210. Next, the processing proceeds to step S708, and the UI control module 301 makes a notification of a request for execution of the backup of the TPM key by displaying a screen such as that of FIG. 8, for example, to the UI 202.

Figure 8:
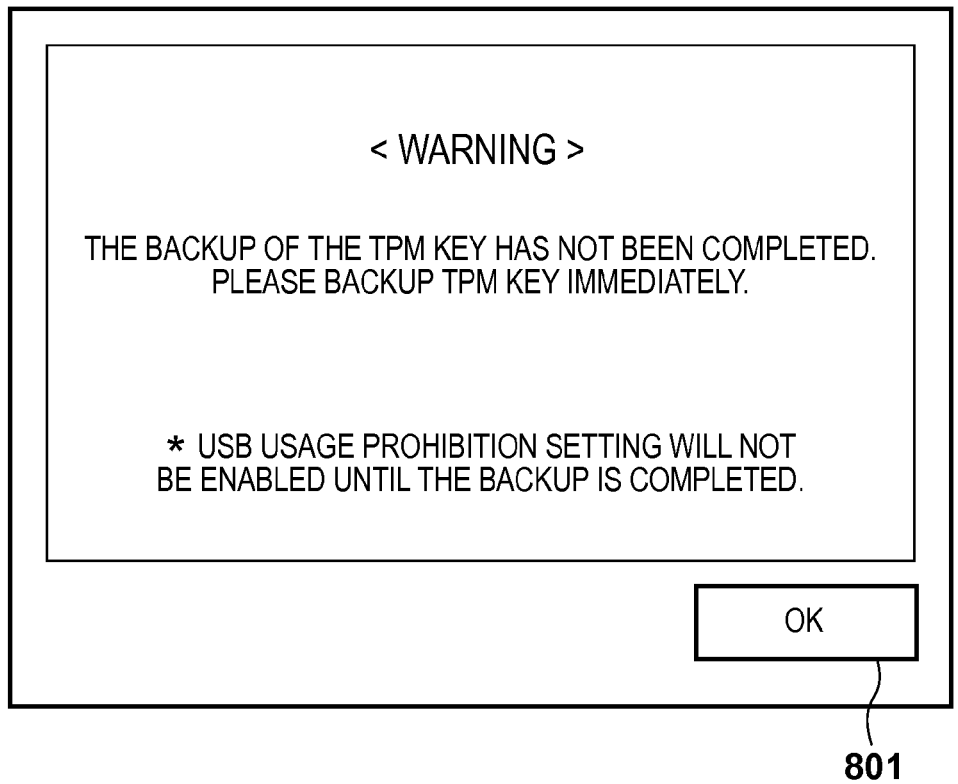
FIG. 8 depicts a view illustrating an example of a warning screen displayed in the multi function peripheral according to the second embodiment when the backup of the TPM key has yet to be completed.

FIG. 8 depicts a view for illustrating an example of a warning screen displayed in the multi function peripheral 101 according to the second embodiment when the backup of the TPM key has not been completed.

On this screen, it is displayed that the backup of the TPM key has not been completed, and that the USB usage prohibition setting cannot be performed until the backup of the TPM key is completed. When, an OK button 801 is pressed by a user on this screen, the processing proceeds to step S709, and transition to a screen for execution of the backup of the TPM key, as shown in FIG. 9, for example, is made.

Figure 9:
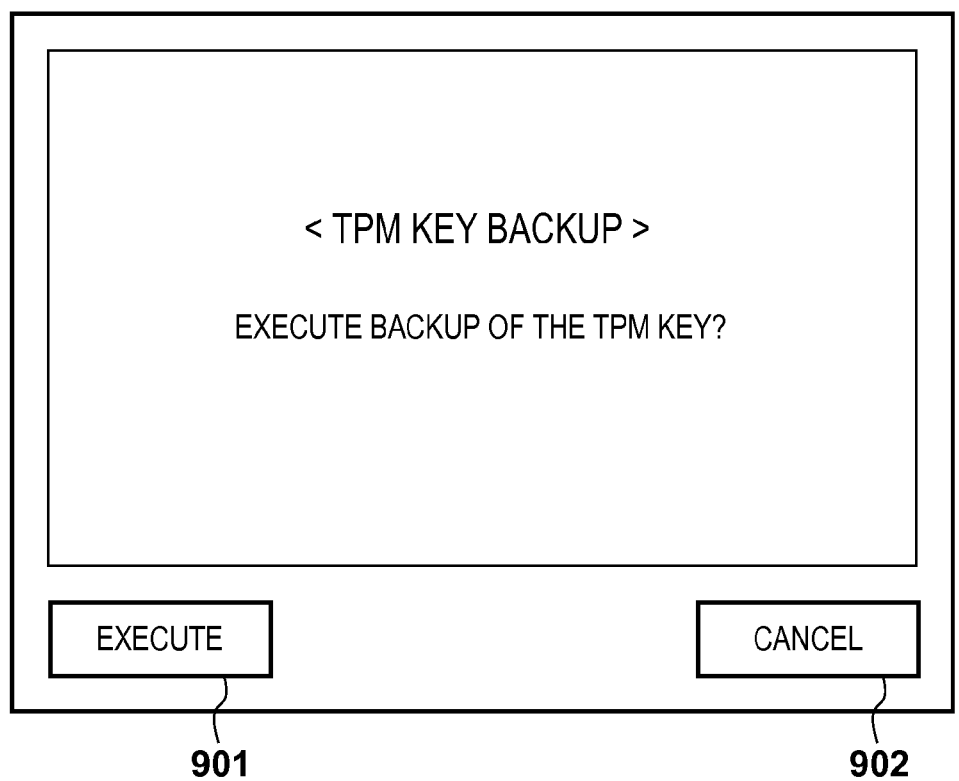
FIG. 9 depicts a view for showing an example of a screen for querying whether or not to execute the backup of the TPM key in the multi function peripheral according to the second embodiment.

FIG. 9 depicts a view for showing an example of a screen for querying whether or not to execute the backup of the TPM key in the multi function peripheral 101 according to the second embodiment.

Figure 10:
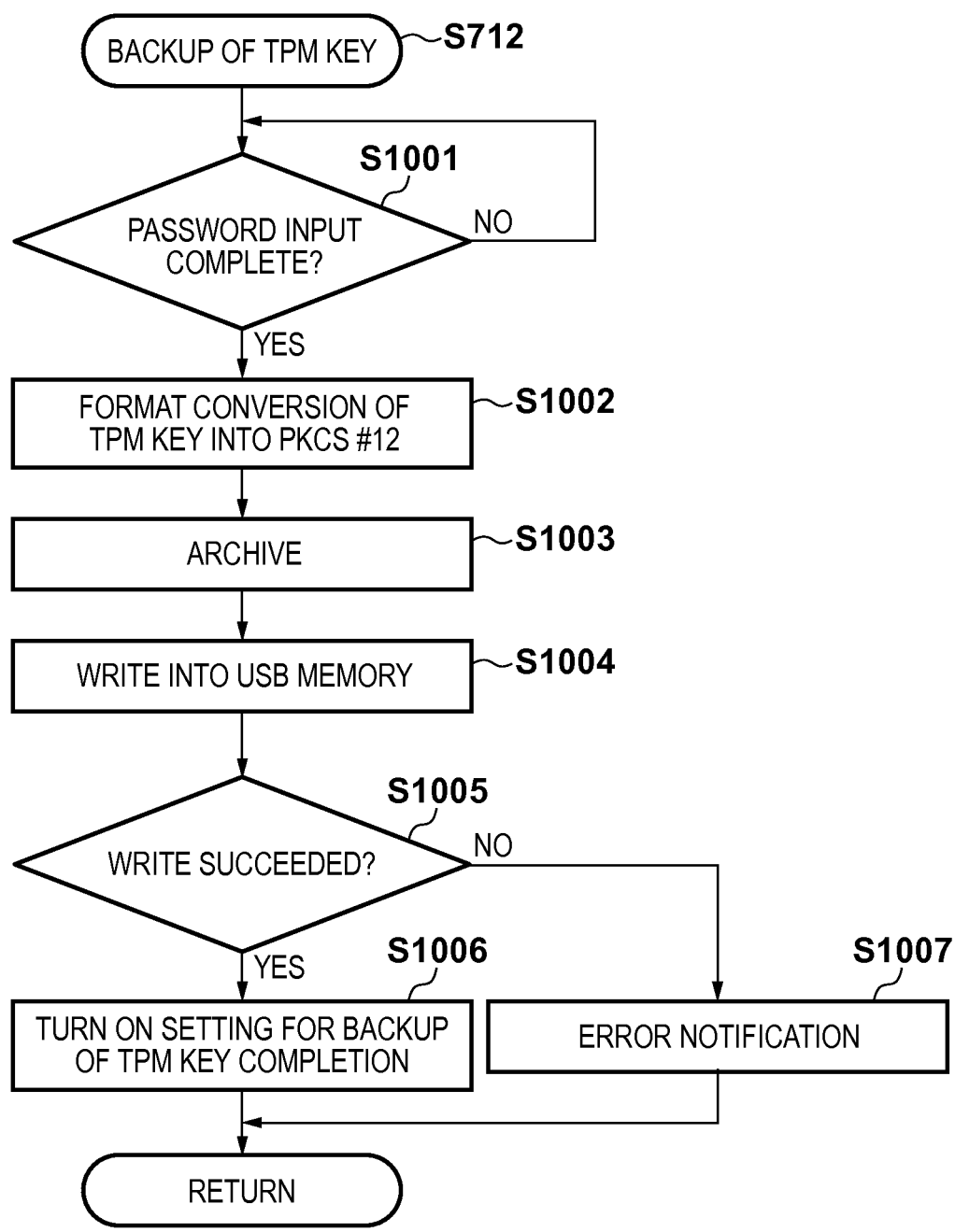
FIG. 10 is a flowchart for describing the TPM key backup processing of step S712 of FIG. 7.

When, a user presses an "execute" button 901 on the screen of FIG. 9, the processing proceeds to step S712 from step S710, and the backup of the TPM key is executed in accordance with the flowchart of FIG. 10, for example.

FIG. 10 is a flowchart for describing the TPM key backup processing of step S712 of FIG. 7.

Figure 11:
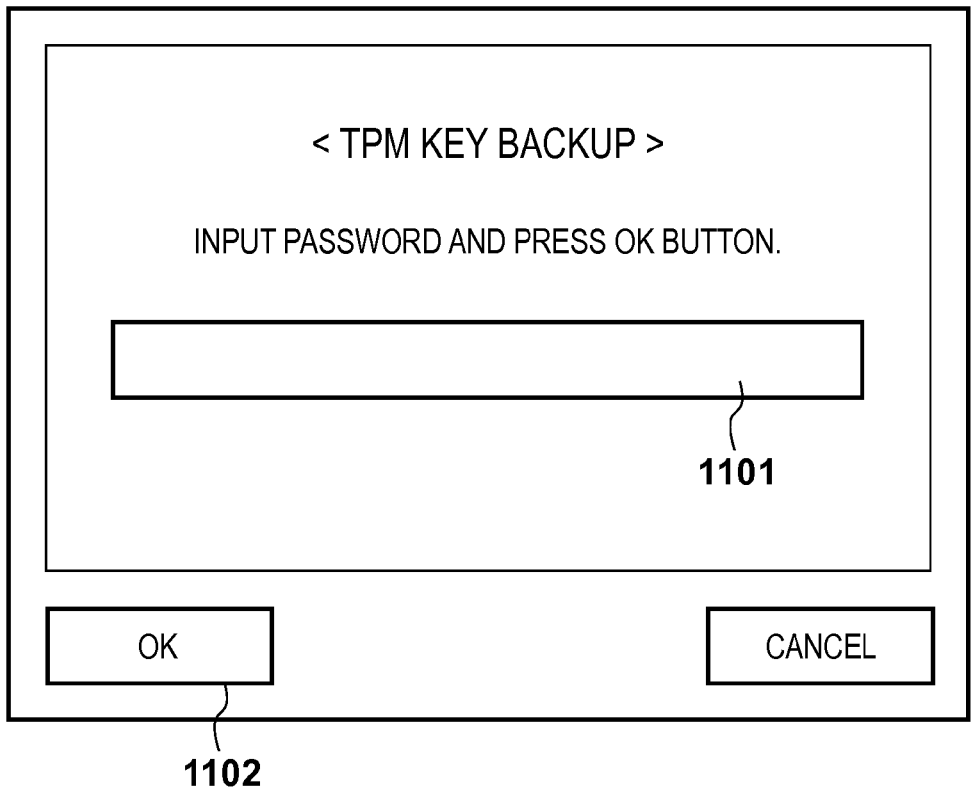
FIG. 11 depicts a view illustrating an example of a password input request screen that the multi function peripheral displays in step S1001 of FIG. 10 according to the second embodiment.

Firstly, in step S1001, the UI control module 301 displays a password input request screen as shown in FIG. 11, for example to the UI 202.

FIG. 11 depicts a view illustrating an example of a password input request screen that the multi function peripheral 101 displays in step S1001 of FIG. 10 according to the second embodiment.

When a user inputs a password into a password input field 1101 in this screen and presses an OK button 1102, the input password is accepted.

When the password input completes and an authentication of the user succeeds in step S1001, the processing proceeds to step S1002, and the encryption processing module 308 performs a format conversion of the TPM key based on the inputted password. In other words, the TPM key is converted into a PKCS #12 (Public Key Cryptography Standard #12) format. Next, the processing proceeds to step S1003, and the encryption processing module 308 archives the format converted TPM key, along with predetermined information by which the multi function peripheral 101 can recognize the format converted TPM key to be the TPM key. Next, the processing proceeds to step S1004, and the USB control module 303 executes the backup of the TPM key by writing the TPM key into the USB memory 210. Then, the processing proceeds to step S1005, and the USB control module 303 determines whether or not the writing into the USB memory 210 succeeds. In step S1005, if the USB control module 303 determines that the writing into the USB memory 210 succeeds, the processing proceeds to step S1006, and the setting value control module 305 sets the predetermined setting value corresponding to the condition for execution of the backup of the TPM key saved in the storage unit 205 to be on (already executed). Then, the processing completes.

Meanwhile, in a case where the USB control module 303, in step S1005, determines that the writing into the USB memory 210 fails, the processing proceeds to step S1007, the UI control module 301 displays a predetermined error notification screen (not shown here) to the UI 202, and the processing completes.

Once again the processing proceeds to step S713 of FIG. 7, and if the USB control module 303 determines that the backup of the TPM key succeeds, the processing proceeds to step S714, and the setting value control module 305 sets the predetermined setting value corresponding to the USB usage prohibition setting saved in the storage unit 205 to be on. In other words, the USB usage prohibition setting is enabled, and the processing completes.

Meanwhile, in a case where the cancel button 902 is pressed in step S715 without the execution button 901 being pressed on the screen of FIG. 9, or in a case where the backup of the TPM key fails in step S713, the processing proceeds to step S716. In step S716, the UI control module 301 displays a warning screen, such as that of FIG. 12, for example, and the processing completes.

Figure 12:
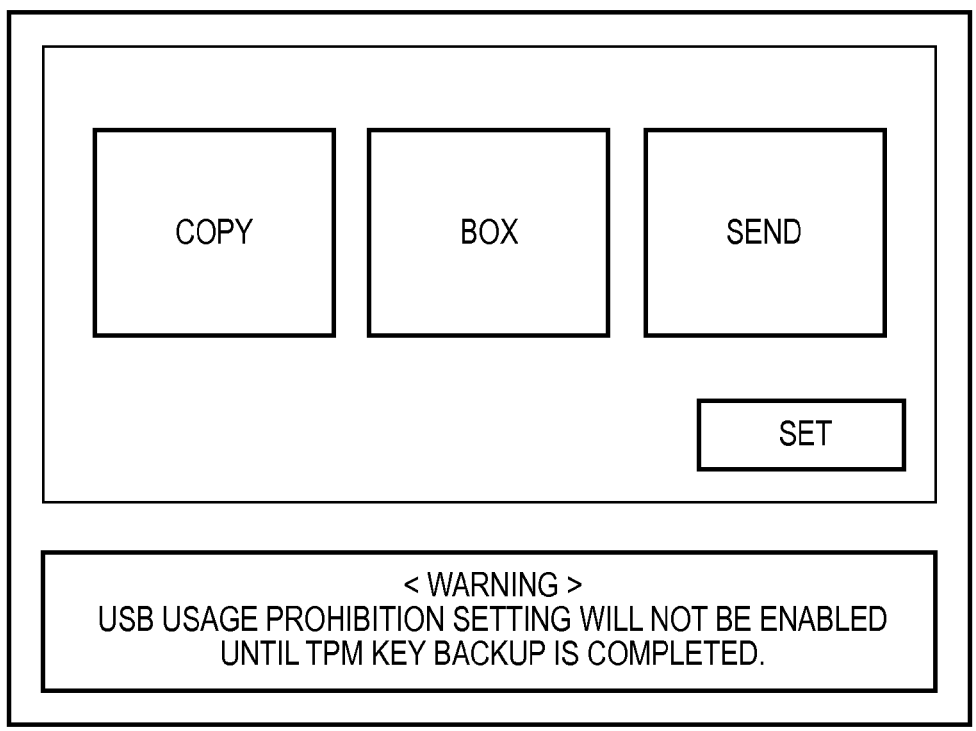
FIG. 12 depicts a view illustrating an example of a warning screen displayed by the multi function peripheral according to the second embodiment.

FIG. 12 depicts a view for illustrating an example of a warning screen displayed by the multi function peripheral 101 according to the second embodiment.

In this screen, it is displayed that until the backup of the TPM key completes, the USB usage setting prohibition will not be enabled, and the user is instructed so that the user performs the backup of the TPM key.

By the second embodiment, as explained above, it is possible to configure such that even in a case where it is requested that the USB usage prohibition setting and the TPM usage setting be used together, the USB usage prohibition setting is not enabled until the backup of the TPM key is completed. With this, it becomes possible for the administrator to perform the backup of the TPM key even if the multi function peripheral 101 is activated in the normal mode, while the USB usage setting prohibition and the TPM usage setting are set.

Third Embodiment

In the previously described second embodiment, explanation was given for a case in which the USB usage prohibition setting is not enabled until the administrator completes the backup of the TPM key.

In the third embodiment, in a case where it is requested that the USB usage prohibition setting and the TPM usage setting be used together on the multi function peripheral 101, the USB usage prohibition setting is enabled even if the backup of the TPM key is not executed. However, explanation will be given for a case in which the writing into the USB memory is allowed only in the exceptional case in which it is the TPM key that is to be written into the USB memory. In other words, even when the setting prohibiting access to the USB and the TPM usage setting are made when the multi function peripheral 101 activates in the normal activation mode, the backup of the TPM key to the USB memory is allowed under the condition that access to the USB memory is for the backup of the TPM key. Note that the hardware configuration of the multi function peripheral 101 and the system configuration according to the third embodiment are the same as in the case of the previously described first embodiment, and so their explanation will be omitted.

Figure 13:
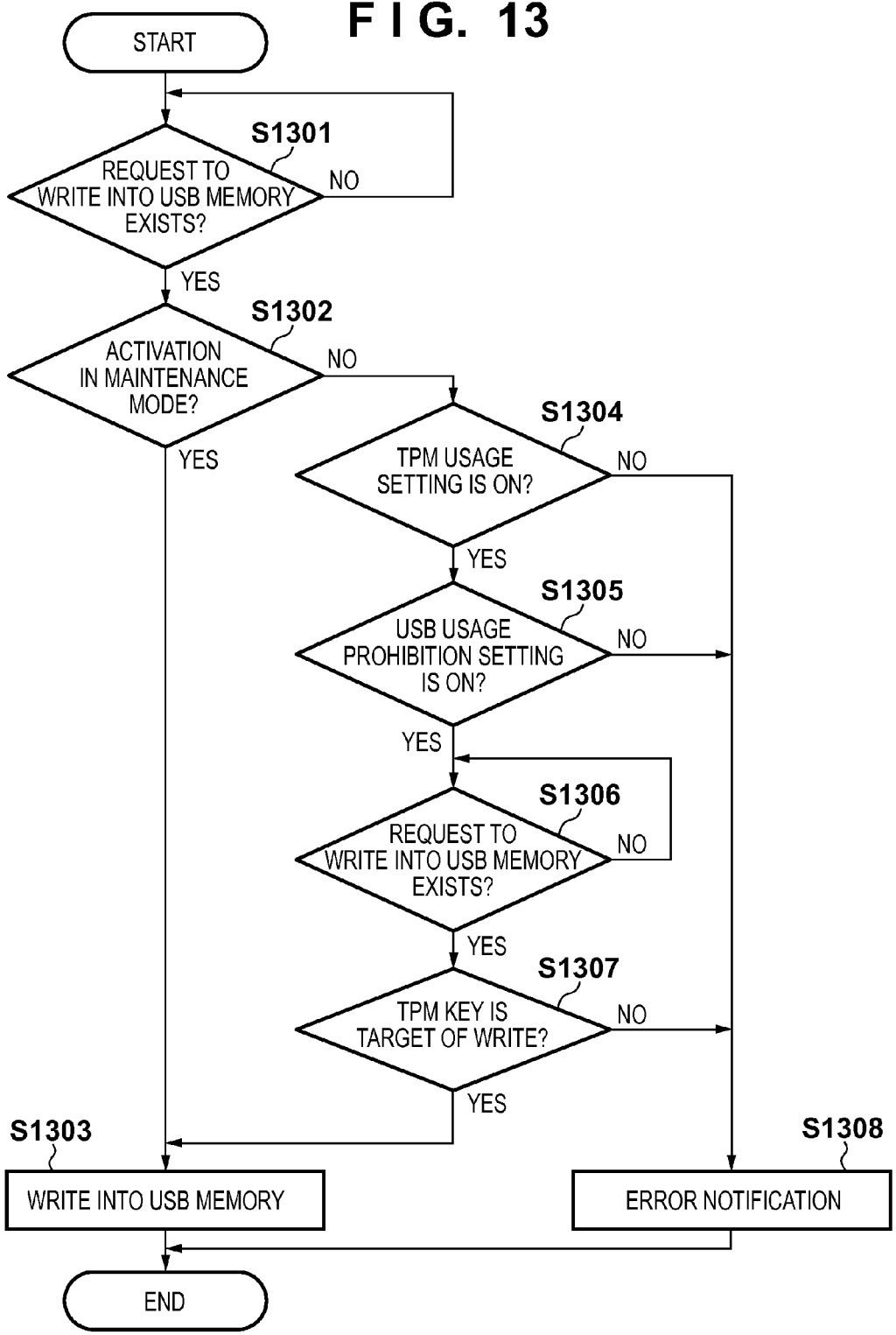
FIG. 13 is a flowchart for describing TPM key backup processing by the multi function peripheral according to a third embodiment of the present invention.

FIG. 13 is a flowchart for describing TPM key backup processing by the multi function peripheral 101 according to the third embodiment of the present invention. This processing is realized by the CPU 203 executing a program deployed into the RAM 204, but here explanation is given with the processing being performed by the control modules shown in FIG. 3. Note that in FIG. 13, because the processing of step S1301 and step S1302 is similar to that of step S401 and step S402 of FIG. 4 of the first embodiment, their explanations are omitted.

In a case where the setting control module 305, in step S1302, determines that the activation is in the normal mode, the processing proceeds to step S1304, and the TPM control module 304 determines whether or not the predetermined setting value corresponding to the TPM usage setting saved in the storage unit 205 is turned on (whether the TPM usage setting is enabled). In a case where the TPM control module 304, in step S1304, determines that the TPM usage setting is not enabled, the processing proceeds to step S1308, the UI control module 301 performs an error notification by performing a display such as is shown in FIG. 6, for example, on the UI 202, and the processing completes. This is because the USB usage prohibition setting and the TPM usage setting are not set.

In a case where, in step S1304, the TPM control module 304 determines that the TPM usage setting is enabled, the processing proceeds to step S1305, and the USB control module 303 determines whether or not the predetermined setting value corresponding to the USB usage prohibition setting saved in the storage unit 205 is turned on (USB usage prohibition). If, in step S1305, it is determined that the USB usage prohibition is set, the processing proceeds to step S1306, and if the USB usage prohibition is not set, the processing proceeds to step S1308, and the UI control module 301 performs an error notification by performing a display such as that of FIG. 6, for example, to the UI 202. This is because, since it is assumed that if the TPM usage setting is enabled, the USB usage prohibition will be set, and if the USB usage prohibition is not set, this is processed as an error.

If, in step S1305, the USB control module 303 determines that the USB usage prohibition setting is turned on, the processing proceeds to step S1306, and the UI control module 301 waits for receipt of the request to write into the USB memory 210 from the UI 202. If, in step S1306, there is the request to write into the USB memory 210, the processing proceeds to step S1307, and the USB control module 303 determines whether or not it is the TPM key that is to be written into the USB memory 210. It is possible, for the determination approach as to whether it is the TPM key that is to be written, to determine whether or not what is to be written is the predetermined information of the TPM key formed by step S1003, for example. If, in step S1307, the USB control module 303 determines that it is a writing of the TPM key, the processing proceeds to step S1303, the USB control module 303 executes the writing into the USB memory 210, and the processing completes. Meanwhile, in step S1307, if it is determined that the target of the writing is not the TPM key, the processing proceeds to step S1308, the UI control module 301 performs an error notification by performing a display such as that of FIG. 6, for example, to the UI 202, and the processing completes.

As explained above, by virtue of the third embodiment, the USB usage prohibition setting is enabled in a case where it is requested that the USB usage prohibition setting and the TPM usage setting both be used on the multi function peripheral, even if the backup of the TPM key is not executed. However, it becomes possible for the administrator to perform the backup of the TPM key by only allowing the writing of the data into the USB memory in the exceptional case in which it is the TPM key that is to be written into the USB memory.

Fourth Embodiment

The information processing apparatus according to the fourth embodiment loads a USB driver saved in the storage apparatus upon transition to a service mode, in a case where the USB usage prohibition is set. Then, notification that the USB device is in a useable state is made to the control module which allows the usage of the USB device. With this, even if the usage prohibition of the USB device is set on the information processing apparatus, service information such as logs, report information, and the like, can be obtained using the USB memory in a case of maintenance of the information processing apparatus by a serviceman. Note that the arrangements of the system configuration and the multi function peripheral according to the fourth embodiment are similar to those of the previously described first embodiment, and so explanation is omitted.

Figure 14:
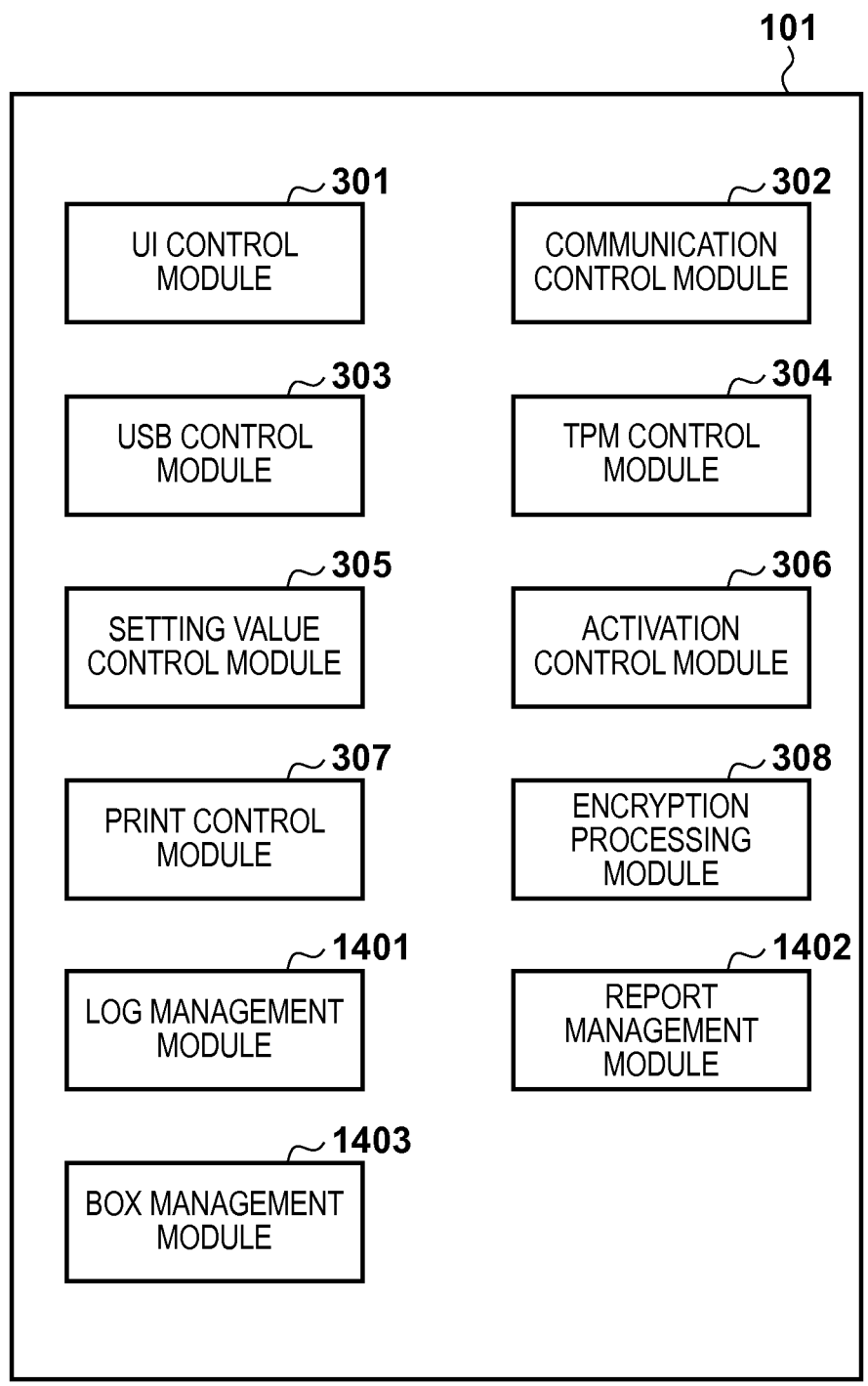
FIG. 14 is a block diagram for explaining a software configuration of the multi function peripheral according to a fourth embodiment of the present invention.

FIG. 14 is a block diagram for explaining a software configuration of the multi function peripheral 101 according to the fourth embodiment of the present invention. Here, while there is no particular limitation, control modules and other modules are realized by control programs stored in the storage unit 205, and by the CPU 203 executing these control programs, the functions corresponding to each module are realized. Note that modules in FIG. 14 that are common to FIG. 3 of the previously described first embodiment are denoted by the same reference numerals, and their explanation will be omitted.

The activation control module 306 executes a predetermined operation mode upon an operation of the serviceman. For example, the multi function peripheral 101 according to the fourth embodiment has two operation modes: the normal mode and the service mode. Here, the normal mode is a general operation mode for users, and is a mode for default operation upon normal activation. The service mode is a mode for performing special work, and is a mode for a worker (serviceman) of a support center, or the like, performing a log or service information obtainment operation upon maintenance work, the occurrence of a malfunction, or the like, for example. Also, transition to the service mode is only enabled in a case where the serviceman performs a predetermined operation on the multi function peripheral 101, and the procedure of the predetermined operation is not published to general users, and is only known by the serviceman.

A log management module 1401 performs management of logs relating to the operation of the multi function peripheral 101. A report management module 1402 performs management of report information of the multi function peripheral 101. A box management module 1403 performs management of a box function of the multi function peripheral 101.

Figure 15:
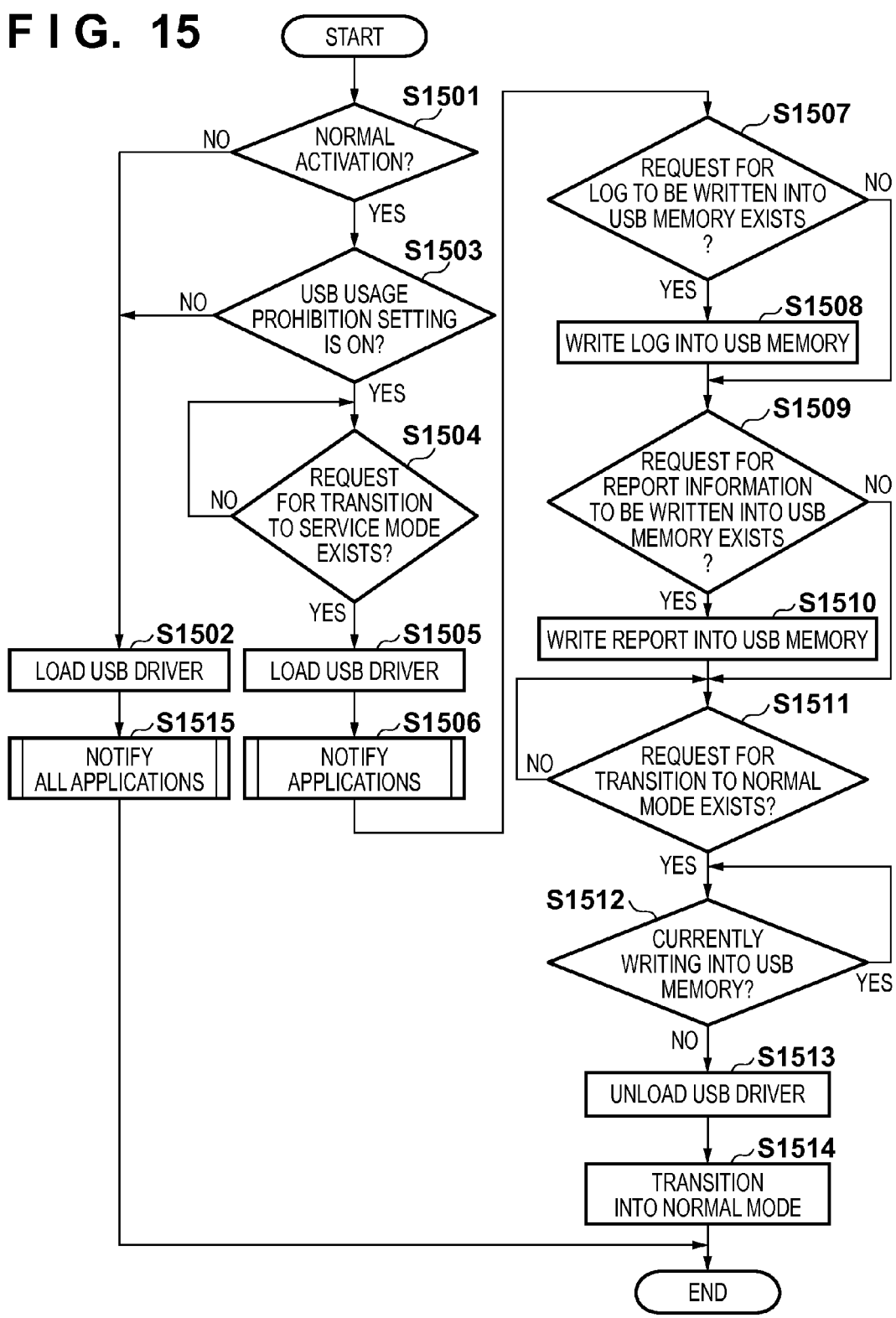
FIG. 15 is a flowchart for describing control that makes possible the usage of a USB device by an operation mode in a case where a USB usage prohibition is set in the multi function peripheral according to the fourth embodiment.

FIG. 15 is a flowchart for describing control to make possible a usage of a USB device by an operation mode in a case where a USB device (here a USB memory) usage prohibition setting has been set on the multi function peripheral 101 according to the fourth embodiment. This processing is realized by the CPU 203 executing a program deployed into the RAM 204, but here explanation is given with the processing being performed by the control modules shown in FIG. 14.

In the fourth embodiment, in a case where the USB memory is not connected to the USB I/F 209 (i.e. in a case where the connection of the USB memory is not recognized by the USB control module 303), the UI control module 301 does not display to a user a screen for performing a request to write into the USB memory. Furthermore, in the fourth embodiment, the usage of the USB memory is made possible not just in the service mode, but also in a case of activation in an activation mode for maintenance (hereinafter referred to as the maintenance mode). Also, in the fourth embodiment, an example of the serviceman obtaining a log or report information as service information in the service mode is shown.

Firstly, the activation control module 306 determines, in step S1501, whether the setting value corresponding to the maintenance mode saved in the storage unit 205 is turned on (whether the activation is a normal activation). Here, if it is determined that the setting value is turned on (it is not a normal activation), the processing proceeds to step S1502, and the USB control module 303 releases the USB usage prohibition setting by executing loading of the USB driver. After this, the processing proceeds to step S1515, notification that the loading of the USB driver has completed is made to all of the applications by calling callback functions, for example, and the processing completes. In the fourth embodiment, as an example of the notification to all of the applications, the log management module 1401 (step S1901), the report management module 1402 (step S1902), and the box management module 1403 (step S1903) are given as targets as is shown in FIG. 19, but the present invention is not limited to this.

Figure 17:
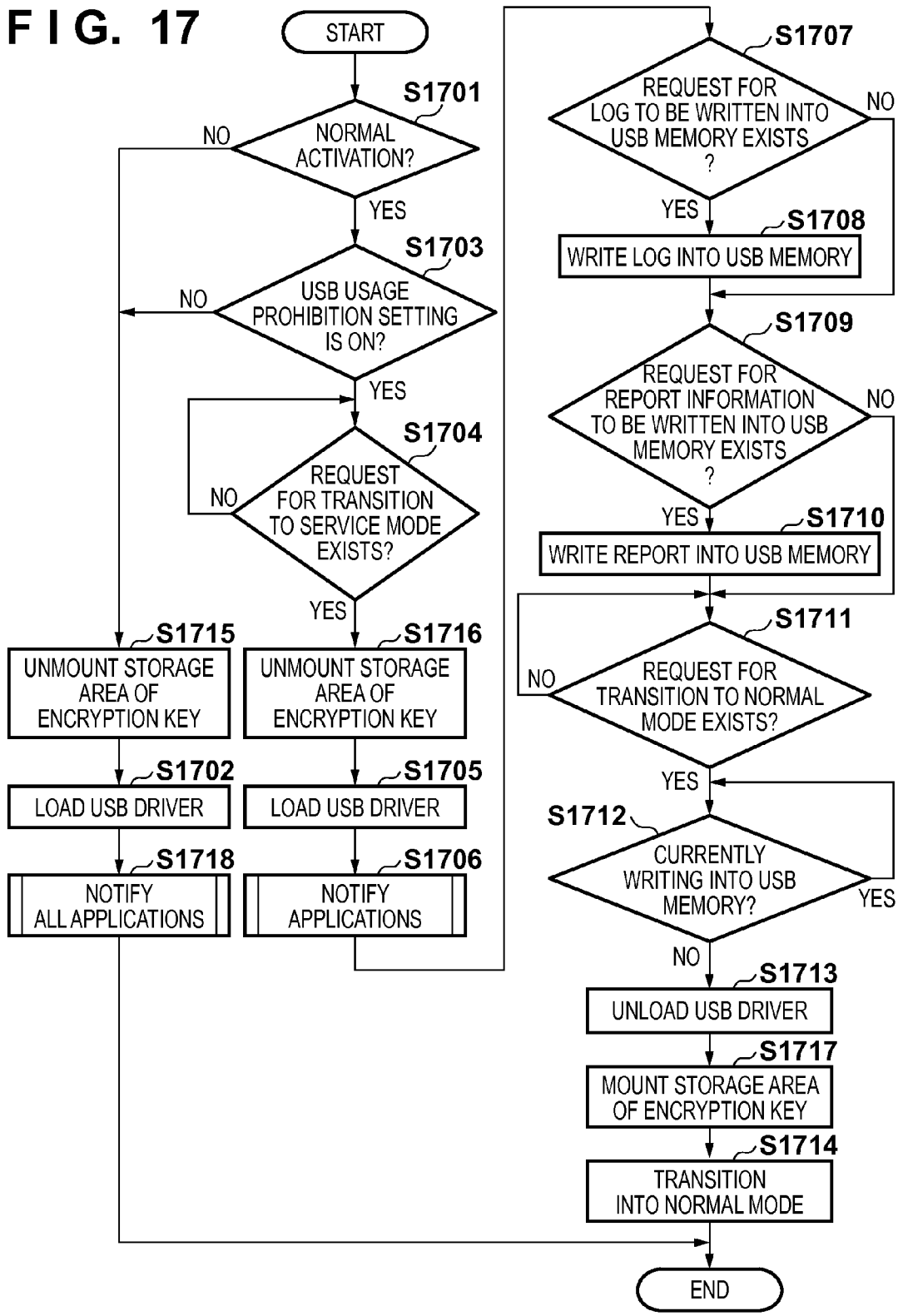
FIG. 17 is a flowchart for describing processing by the multi function peripheral according to a fifth embodiment.
Figure 19:
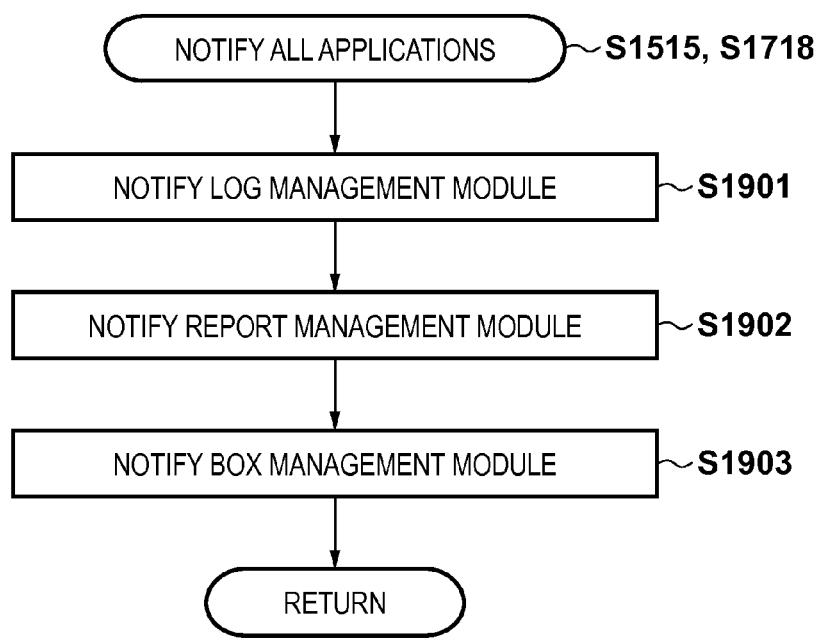
FIG. 19 is a flowchart for describing processing of step S1515 of FIG. 15 or step S1718 of FIG. 17.

FIG. 19 is a flowchart for describing processing of step S1515 of FIG. 15 or step S1718 of FIG. 17.

Firstly, in step S1901, the log management module 1401 is notified, and next, in step S1902, the report management module 1402 is notified. Then, finally in step S1903, the box management module 1403 is notified, and the processing completes.

Meanwhile, if it is determined that the setting value is turned off (activation in the normal mode) in step S1501, the processing proceeds to step S1503, and the USB control module 303 determines whether the setting value saved in the storage unit 205 corresponding to the USB usage prohibition setting is turned on (whether the USB usage prohibition setting is enabled). If it is determined that the setting value is turned off (the USB usage prohibition setting is disabled), the processing proceeds to step S1502, the USB control module 303 executes the loading of the USB driver, and the processing proceeds to step S1515.

On the other hand, in a case where it is determined, in step S1503, that the setting value is turned on (the USB usage prohibition setting is enabled), the processing proceeds to step S1504 without the USB control module 303 executing the loading of the USB driver. In step S1504, the activation control module 306 determines whether or not a request for transition to the service mode by an operation of the UI 202 is accepted, and if such a request is accepted, the operation mode is transitioned into the service mode, and the processing proceeds to step S1505.

In the fourth embodiment, the example of an operation on the UI 202 being required as the service mode transition condition is illustrated, but alternatively, configuration may be taken so as to transition into the service mode in a case in which it could be confirmed by authentication that the user is the serviceman, for example.

In step S1505, the USB control module 303 executes the loading of the USB driver similarly to step S1502. Next, the processing proceeds to step S1506, and notification that the loading of the USB driver has completed by calling callback functions, for example, is made to applications for which the usage of the USB device is allowed.

Figure 16:
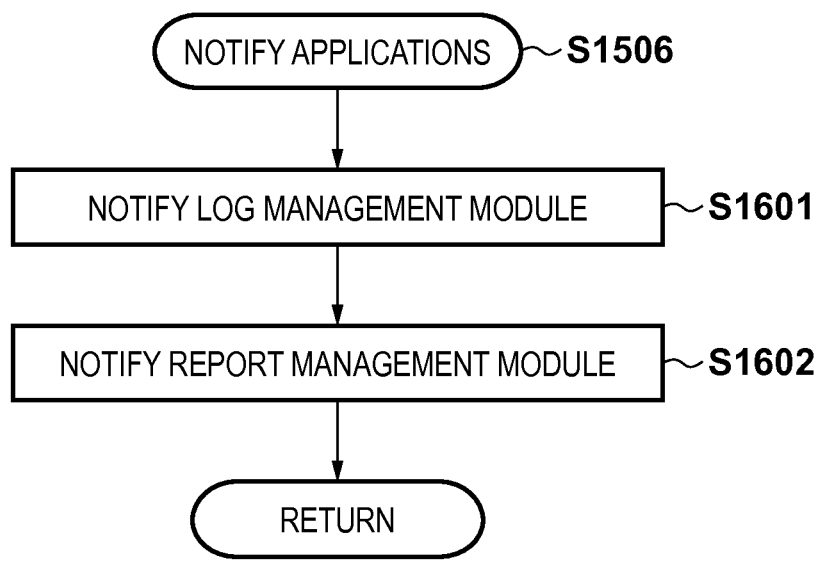
FIG. 16 is a flowchart for describing processing of step S1506 of FIG. 15 or step S1706 of FIG. 17.

In the fourth embodiment, as examples of applications for which the usage of the USB is allowed, the log management module 1401 (step S1601) and the report management module 1402 (step S1602), as shown in FIG. 16, are given, but the present invention is not limited to this.

FIG. 16 is a flowchart for describing the processing of step S1506 of FIG. 15.

Firstly, in step S1601 the log management module 1401 is notified, and next, in step S1602, the report management module 1402 is notified, and the processing completes.

Next, the processing proceeds to step S1507, and if a request that a log be written into the USB memory is accepted from the UI 202, the processing proceeds to step S1508, and the log management module 1401 writes a log saved in the storage unit 205 into the USB memory 210 via the USB control module 303. Next, the processing proceeds to step S1509, and if a request for report information to be written into the USB memory is accepted from the UI 202, the processing proceeds to step S1510, and the report management module 1402 writes report information saved in the storage unit 205 into the USB memory 210 via the USB control module 303. Note that in step S1507, if the log write request is not accepted, the processing proceeds to step S1509, and in step S1509, if the report information write request is not accepted, the processing proceeds to step S1511.

In step S1511, if a request for transition to the normal mode is accepted due to an operation from the UI 202, the processing proceeds to step S1512, and the USB control module 303 determines whether or not the USB memory 210 is being written into. Here, if the USB control module 303 determines that the USB memory 210 is being written into, step S1512 is executed until the write processing completes, and when the write processing completes, the processing proceeds to step S1513, and the unloading of the USB driver is executed. When, in step S1513, the unloading of the USB driver completes, the processing proceeds to step S1514, the activation control module 306 transitions the operation mode into the normal mode, and the processing completes.

In this way, even in a case where the USB usage prohibition is set, the connected USB device can be used by loading the USB driver when transition is made into the service mode. Also, because the loaded USB driver is unloaded when transition is made into the normal mode from the service mode, it is possible to configure such that the normal mode is a state in which the USB usage prohibition is set.

Explanation will be given for the flow of the above control with reference to FIG. 18.

Figure 18:
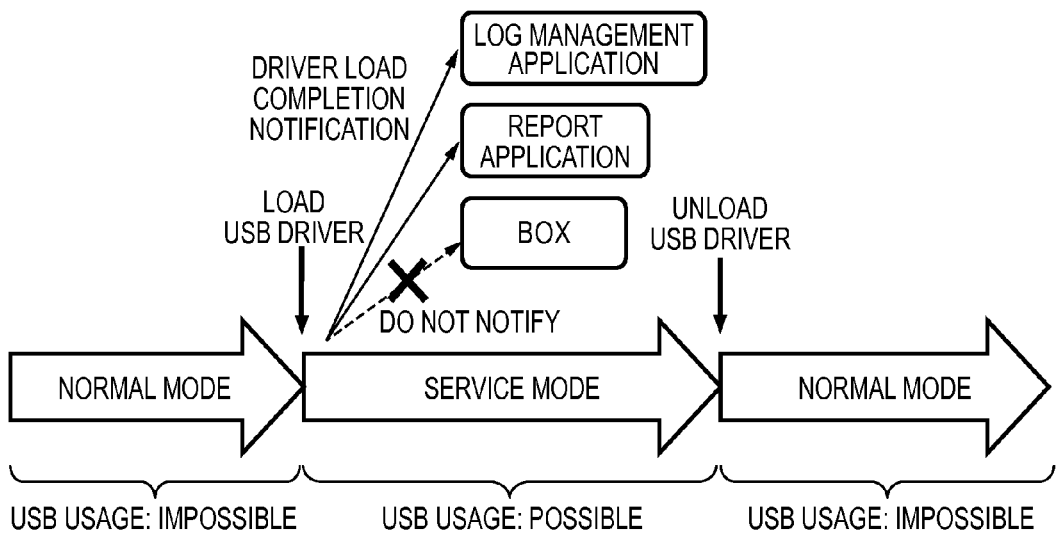
FIG. 18 depicts a view for explaining an example of a modification of the operation mode in the multi function peripheral according to the fourth embodiment.

FIG. 18 depicts a view for explaining an example of a modification of the operation mode in the multi function peripheral 101 according to the fourth embodiment.

In a case where the USB usage prohibition is set, the USB device cannot be used if the multi function peripheral 101 is in the normal mode, but when the multi function peripheral 101 transitions to the service mode, the USB driver is loaded, and notification is made to the log management module 1401 and the report management module 1402 only. Also, when the multi function peripheral 101 transitions from the service mode into the normal mode, the USB driver is unloaded.

As explained above, by virtue of the fourth embodiment, even if the USB usage prohibition is set for the multi function peripheral 101, the serviceman is able to obtain service information such as logs and report information using the USB device, and it becomes possible to maintain serviceability.

Fifth Embodiment

In the previously described fourth embodiment, explanation was given for an example in which if the serviceman knows the operation on the UI 202 for transitioning into the service mode, the serviceman is able to use the USB device in the service mode. However, in the fourth embodiment, there is the risk that confidential information will be written simultaneously when writing the service information into the USB memory in cases where software infected by malware is operating within the device. Also, there is a possibility that when the confidential information within the device is written into the USB memory, this will lead to leakage of the information.

In the fifth embodiment, by firstly unmounting an area in which confidential information has been saved, when transitioning into the service mode, even in a case where malicious software is operating, it is possible to prevent from writing the confidential information along with the service information into the USB memory. Note that the arrangement of the system configuration and the multi function peripheral according to the fifth embodiment are similar to those of the previously described first embodiment, and so explanation is omitted.

FIG. 17 is a flowchart for describing processing by the multi function peripheral 101 according to the fifth embodiment. This processing is realized by the CPU 203 executing a program deployed into the RAM 204, but here explanation is given with the processing being performed by the control modules shown in FIG. 14. Note that step S1701 to step S1714 of FIG. 17 are similar to step S1501 to step S1514 of FIG. 15 in the previously described fourth embodiment. In the fifth embodiment, an example is illustrated in which a storage area of an encryption key, which is confidential information, is firstly unmounted, but the present invention is not limited to this. Also, in the fifth embodiment, similarly to the fourth embodiment, the usage of the USB memory is made possible not just in the service mode, but also in a case of activation in the maintenance mode.

In step S1701, the activation control module 306 determines whether the setting value corresponding to the maintenance mode saved in the storage unit 205 is turned on (whether the multi function peripheral 101 is activated in the maintenance mode). If it is determined, in step S1701, that the setting value is on (activation in the maintenance mode), the processing proceeds to step S1715, and the activation control module 306 unmounts the storage area of the encryption key. Then, the processing proceeds to step S1702, the USB control module 303 executes the loading of the USB driver, and the processing proceeds to step S1718. In step S1718, the USB control module 303 makes a notification that the loading of the USB driver has completed to all of the applications by calling a callback function, for example. In the fifth embodiment, as an example of the notification to all of the applications, the log management module (step S1901), the report management module (step S1902), and the box management module (step S1903) are given as targets as is shown in FIG. 19, but the present invention is not limited to this.

Meanwhile, if it is determined, that the setting value is turned off (activation in the normal mode) in step S1701, the processing proceeds to step S1703, and the USB control module 303 determines whether the setting value saved in the storage unit 205 corresponding to the USB usage prohibition setting is turned on (whether the USB usage prohibition setting is enabled). In step S1703, if it is determined the setting value is turned off (the USB usage prohibition setting is disabled), the processing proceeds to step S1715, and the activation control module 306 unmounts the storage area of the encryption key. Then, the processing proceeds to step S1702, the USB control module 303 executes the loading of the USB driver, and the processing proceeds to step S1718.

Also, in a case where it is determined, in step S1703, that the setting value is turned on (the USB usage prohibition setting is enabled), the processing proceeds to step S1704 without the USB control module 303 executing the loading of the USB driver. In step S1704, the activation control module 306 determines whether or not a request for transition to the service mode by an operation of the UI 202 is accepted, and if such a request is accepted, the operation mode is transitioned into the service mode, and the processing proceeds to step S1716.

In the fifth embodiment, the example of an operation on the UI 202 being required as the service mode transition condition is illustrated, but alternatively, configuration may be taken so as to transition into the service mode in a case in which it could be confirmed by user authentication that the user is the serviceman, for example. In step S1716, the activation control module 306 unmounts the storage area of the encryption key. Then, the processing proceeds to step S1705, the USB control module 303 executes the loading of the USB driver, and when the loading of the USB driver is completed, the processing proceeds to step S1706. In step S1706, the USB control module 303 makes a notification to the applications for which the usage of the USB is allowed by calling a callback function, for example.

In the fifth embodiment, similarly to the fourth embodiment, as examples of the applications for which the usage of the USB device is allowed, the log management module (step S1601), and the report management module (step S1602) are made to be the targets as is shown in FIG. 16, but the present invention is not limited to this.

Next, the processing proceeds to step S1707, it is determined whether or not a request to write a log into the USB device is accepted from the UI 202, and if such a request is accepted, the processing proceeds to step S1708, and the log management module 1401 writes a log saved in the storage unit 205 into the USB memory 210 via the USB control module 303. Here, even if malicious software attempts to write the encryption key into the USB memory 210, the software cannot access the encryption key because the area is unmounted.

Next, the processing proceeds to step S1709, and it is determined whether or not a request for report information to be written into the USB memory is accepted from the UI 202, and if such a request is accepted, the processing proceeds to step S1710. In step S1710, the report management module 1402 writes report information saved in the storage unit 205 into the USB memory 210 via the USB control module 303.

Next, the processing proceeds to step S1711, and it is determined whether or not a request for transition to the normal mode made by an operation of the UI 202 is accepted, and if such a request is accepted, the processing proceeds to step S1712, and the USB control module 303 determines whether or not the USB memory 210 is being written into. Here, when the USB control module 303 determines that the USB memory 210 is being written into, step S1712 is executed until the write processing completes, and when the write processing completes, the processing proceeds to step S1713, and the unloading of the USB driver is executed. Then the processing proceeds to step S1717, and the activation control module 306 mounts the storage area of the encryption key. Next, the processing proceeds to step S1714, the activation control module 306 transitions the operation mode into the normal mode, and the processing completes.

As explained above, according to the fifth embodiment, even in a case where malicious software is operating, further security strengthening can be achieved by preventing confidential information from being written into the USB memory along with the service information.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2013-240257, filed Nov. 20, 2013, and Japanese Patent Application No. 2014-115316, filed Jun. 3, 2014, which are hereby incorporated by references herein in their entirety.

What is claimed is:

1. An information processing apparatus, comprising:
at least one processor coupled to a memory device and programmed to provide:
a setting unit configured to perform a setting for limiting an access by users including a service person to a removable storage medium connected to the information processing apparatus; and
a controller configured to control to limit an access by the users including the service person to the removable storage medium in a case where the setting for limiting the access to the removable storage medium is set by the setting unit and the information processing apparatus is not in a maintenance mode or a service mode, and to permit an access by the users including the service person to write information from the information processing apparatus to the removable storage medium in a case where the setting for limiting the access to the removable storage medium is set by the setting unit and the information processing apparatus is in the maintenance mode or the service mode,
wherein the maintenance mode and the service mode are activated by a predetermined operation to the information processing apparatus by the service person.

2. The information processing apparatus according to claim 1, further comprising a processor programmed to provide a Trusted Platform Module (TPM) controller configured to connect and control a TPM,
wherein the controller further controls to, in a case where the information processing apparatus is in the maintenance mode and the setting unit sets the setting for limiting the access to the removable storage medium and a usage setting for the TPM, perform a backup of a TPM key into the removable storage medium under a condition that the backup of the TPM key to the removable storage medium is not executed.

3. The information processing apparatus according to claim 2, wherein the controller, when the backup of the TPM key into the removable storage medium is performed, requests a user to input a password and performs a format conversion of the TPM key based on the input password.

4. The information processing apparatus according to claim 2, wherein the settings performed by the setting unit include the setting for limiting the access by users including the service person to the removable storage medium and a setting for forcing a usage of the TPM.

5. The information processing apparatus according to claim 1, further comprising a processor programmed to provide a TPM controller configured to connect and control a TPM,
wherein the controller further controls to, in a case where the information processing apparatus is in the maintenance mode and the setting unit sets the setting for limiting the access to the removable storage medium and a usage setting for the TPM, perform the backup of the TPM key into the removable storage medium in a case where writing into the removable storage medium is a backup of the TPM key.

6. The information processing apparatus according to claim 5, wherein the controller, when the backup of the TPM key into the removable storage medium is performed, requests a user to input a password and performs a format conversion of the TPM key based on the input password.

7. The information processing apparatus according to claim 1, wherein the maintenance mode is a mode in which the service person performs maintenance of the information processing apparatus.

8. The information processing apparatus according to claim 1, wherein the removable storage medium comprises a USB memory connected via a USB interface.

9. The information processing apparatus according to claim 1, wherein the controller is further configured to control to not load a driver program for the removable storage medium to limit an access by users including the service person to the removable storage medium in a case where the setting for limiting the access to the removable storage medium is set by the setting unit and the information processing apparatus is not in the maintenance mode or the service mode, and to load the driver program of the removable storage medium to permit an access by users including the service person to write information from the information processing apparatus to the removable storage medium in a case where the setting for limiting the access to the removable storage medium is set by the setting unit and the information processing apparatus is in the maintenance mode or the service mode.

10. An information processing apparatus, comprising:
at least one processor coupled to a memory device and programmed to provide:
a setting unit configured to set a use limitation of users including a service person for a storage device capable of connecting to the information processing apparatus;
a release unit configured to release, if an instruction is made for transition into a maintenance mode or a service mode, the use limitation for the storage device set by the setting unit;
a notification unit configured to notify an application that the release unit released the use limitation for the storage device; and
a controller configured to control to, in response to an instruction that instructs a transition from the maintenance mode or the service mode to a normal mode, set the use limitation set by the setting unit for the storage device to limit an access to the storage device from the users of the information processing apparatus,
wherein the maintenance mode and the service mode are activated by a predetermined operation to the information processing apparatus by the service person.

11. The information processing apparatus according to claim 10, wherein the release unit releases the use limitation for the storage device by loading a USB driver.

12. The information processing apparatus according to claim 11, wherein the controller sets the use limitation for the storage device by unloading the USB driver.

13. The information processing apparatus according to claim 10, further comprising a processor programmed to provide an activation control unit configured to:
when the release unit releases the use limitation for the storage device, unmount an area storing confidential information, and
when transition is made from the maintenance mode or the service mode to the normal mode, mount the area.

14. The information processing apparatus according to claim 10, wherein the controller is further configured to control to not load a driver program for the storage device to limit the access by users including the service person to the storage device in a case where the use limitation for the storage device is set by the setting unit and the information processing apparatus is not in a maintenance mode or a service mode, and to load the driver program of the storage device to permit an access by users including the service person to write information from the information processing apparatus to the storage device in a case where the use limitation is set by the setting unit and the information processing apparatus is in the maintenance mode or the service mode.

15. A method of controlling an information processing apparatus having a connection unit for connecting a storage device, the method comprising:
performing a setting for limiting an access by users including a service person to a removable storage medium; and
controlling to limit an access by the users including the service person to the removable storage medium in a case where the setting for limiting the access to the removable storage medium is set and the information processing apparatus is not in a maintenance mode or a service mode, and to permit an access by the users including the service person to write information from the information processing apparatus to the removable storage medium in a case where the setting for limiting the access to the removable storage medium is set and the information processing apparatus is in the maintenance mode or the service mode,
wherein the maintenance mode and the service mode are activated by a predetermined operation to the information processing apparatus by the service person.

16. A non-transitory computer-readable storage medium storing a program that when executed causes a computer to perform a method of controlling an information processing apparatus, the method comprising steps of:
performing a setting for limiting an access by users including a service person to a removable storage medium; and
controlling to limit an access by the users including the service person to the removable storage medium in a case where the setting for limiting the access to the removable storage medium is set and the information processing apparatus is not in a maintenance mode or a service mode, and to permit an access by the users including the service person to write information from the information processing apparatus to the removable storage medium in a case where the setting for limiting the access to the removable storage medium is set and the information processing apparatus is in the maintenance mode or the service mode,
wherein the maintenance mode and the service mode are activated by a predetermined operation to the information processing apparatus by the service person.

* * * * *